(12) United States Patent
Kim et al.

(10) Patent No.: US 11,175,903 B2
(45) Date of Patent: Nov. 16, 2021

(54) METHOD FOR UPDATING SPECIFIC UPDATE-REQUIRED SERVICE MODULE IN EXTENSION SERVICE FRAMEWORK AND EXTENSION SERVICE FRAMEWORK SERVER USING THE SAME

(71) Applicant: Obigo Inc., Seongnam-si (KR)

(72) Inventors: Hyun Ju Kim, Seongnam-si (KR); Kyeong Oh Min, Hwaseong-si (KR); Doo Hyun Han, Seongnam-si (KR); Doe Yun Hwang, Seoul (KR)

(73) Assignee: Obigo Inc.

( * ) Notice: Subject to any disclaimer, the term of this patent is extended or adjusted under 35 U.S.C. 154(b) by 0 days.

(21) Appl. No.: 17/033,286

(22) Filed: Sep. 25, 2020

(65) Prior Publication Data

US 2021/0103437 A1    Apr. 8, 2021

(30) Foreign Application Priority Data

Oct. 7, 2019    (KR) .......................... 10-2019-0124202

(51) Int. Cl.
*G06F 9/445*    (2018.01)
*G06F 8/65*    (2018.01)
(Continued)

(52) U.S. Cl.
CPC .................. *G06F 8/65* (2013.01); *G06F 8/61* (2013.01); *H04L 67/34* (2013.01)

(58) Field of Classification Search
CPC ............... G06F 8/65; G06F 8/61; H04L 67/34
(Continued)

(56) References Cited

U.S. PATENT DOCUMENTS 9,122,558 B2 *    9/2015    Ewington .................. G06F 8/63
10,860,305 B1 *    12/2020    Harland ................ G06F 9/4411
(Continued)

FOREIGN PATENT DOCUMENTS

KR    2013-0036794    4/2013
KR    10-1463604    11/2014
(Continued)

OTHER PUBLICATIONS

European Extended Search Report issued in application No. 20197540.6 dated Feb. 18, 2021, 11 pages.
(Continued)

*Primary Examiner* — Chuck O Kendall
(74) *Attorney, Agent, or Firm* — Maschoff Brennan; Jonathan M. Benns

(57) ABSTRACT

A method for updating a service module in an extension service framework, if a new update package has been stored in an update server, is provided. The method includes steps of: an extension service framework server (a) transmitting an acquired request message to a download service module to transmit a request for a download to the update server; (b) if a request message for installation is transmitted from the download service module, verifying, unpacking and storing the update package in a first storage; (c) (i) allowing the service module in the extension service framework server to install the unpacked update files or (ii) if the service module is in another device, transmitting the unpacked update files to a second storage to install the unpacked update files in the second storage; and (d) allowing the service module to restart and reconnect with the extension service framework server.

20 Claims, 9 Drawing Sheets

(51) Int. Cl.
*G06F 8/61* (2018.01)
*H04L 29/08* (2006.01)

(58) Field of Classification Search
USPC .................................................. 717/168–178
See application file for complete search history.

(56) References Cited

U.S. PATENT DOCUMENTS

| | | | |
|---|---|---|---|
| 2015/0339114 A1 | 11/2015 | Rockwell et al. | |
| 2017/0039372 A1* | 2/2017 | Koval | G01R 22/06 |
| 2019/0265965 A1 | 8/2019 | Acharya et al. | |

FOREIGN PATENT DOCUMENTS

| | | |
|---|---|---|
| KR | 2015-0064474 | 6/2015 |
| KR | 2015-0074414 | 7/2015 |
| KR | 2017-0119414 | 10/2017 |
| KR | 10-1917378 | 11/2018 |
| WO | 2017149825 A1 | 9/2017 |

OTHER PUBLICATIONS

Anonymous: "Installation (computer programs)", Sep. 30, 2019, XP05577381, pp. 1-3, Retrieved from the Internet URL: https://en.wikipedia.org/w/index.php?title=Installation_(computer_programs)&oldid=918752596 7 pages.
Anonymous: "Progress Bar", Aug. 24, 2019, XP055773808, pp. 1-2, Retrieved from the Internet URL: https://en.wikipedia.org/w/index.php?title=Progress_bar&oldid=912283562, 3 pages.
Anonymous: "RPM Package Manager (RPM)", Sep. 28, 2019, XP055773788, pp. 1-4, Retrieved from the Internet URL: https://en.wikipedia.org/w/index.php?title=RPM_Package_Manager&oldid=918414380, 7 pages.
Anonymous: "JAR (file format)", Sep. 21, 2019, XP055773791, pp. 1-3, Retrieved from the Internet URL: https://en.wikipedia.org/w/index.php?title=JAR_(file_format)&oldid=916956744, 4 pages.

* cited by examiner

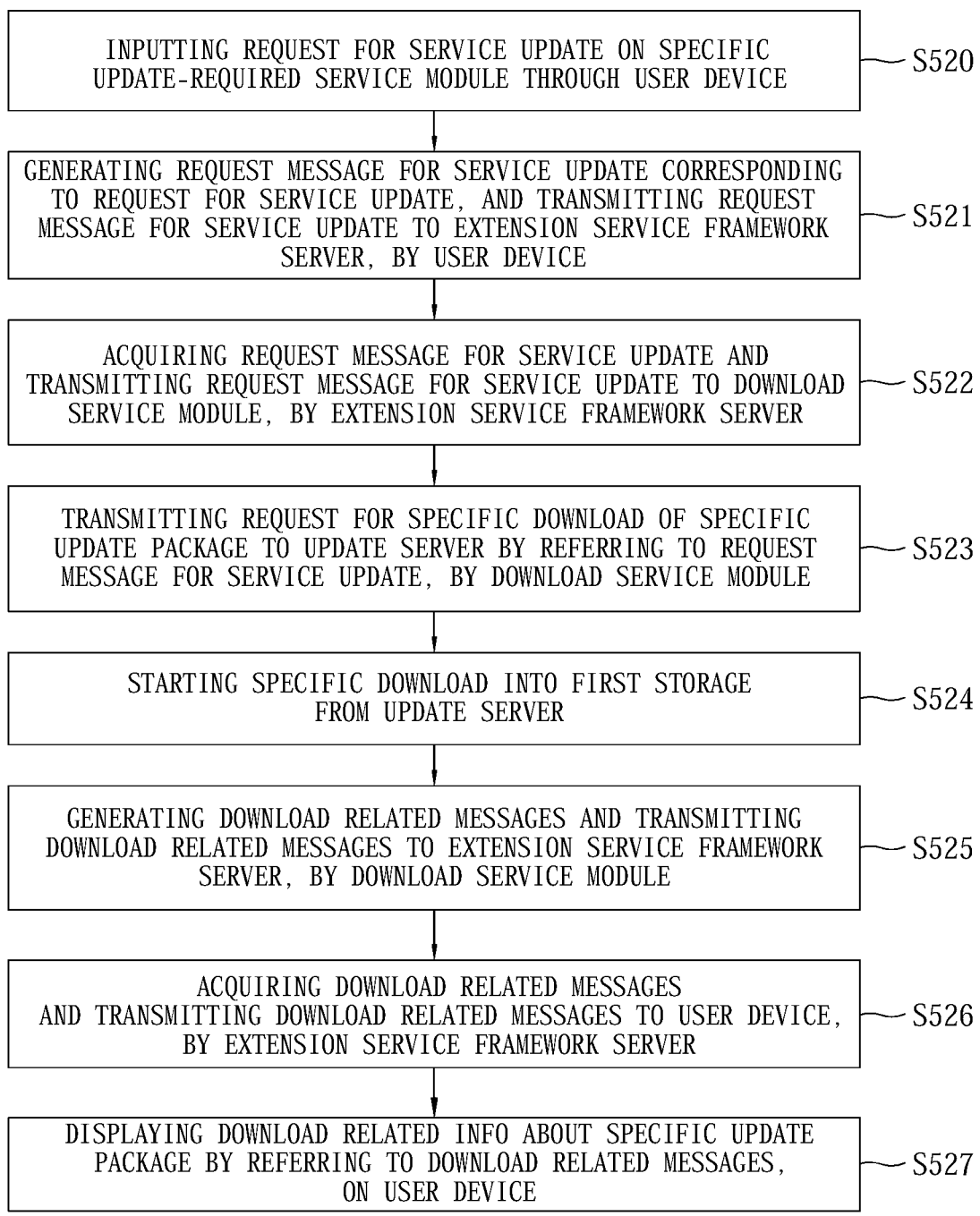

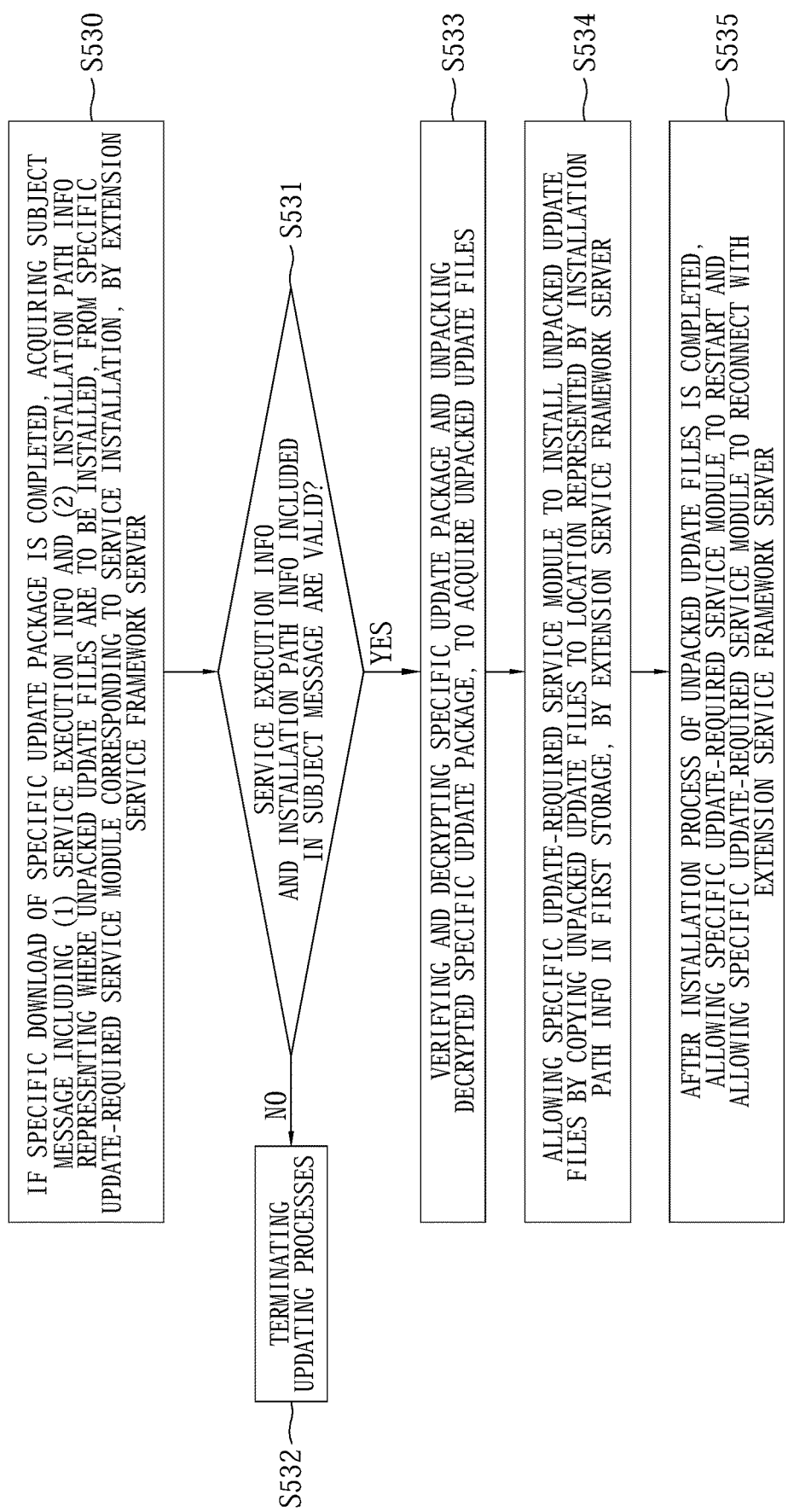

METHOD FOR UPDATING SPECIFIC UPDATE-REQUIRED SERVICE MODULE IN EXTENSION SERVICE FRAMEWORK AND EXTENSION SERVICE FRAMEWORK SERVER USING THE SAME

FIELD OF THE DISCLOSURE

The present disclosure relates to a method for updating a specific update-required service module in an extension service framework and an extension service framework server using the same.

BACKGROUND OF THE DISCLOSURE

With the recent advance in technology, a plurality of electronic devices are installed in mechanical devices such as vehicles, and there is a need to periodically update such electronic devices.

However, conventionally, in order to update the plurality of the electronic devices in a vehicle, the vehicle has to be taken to a place designated by its manufacturer to allow the manufacturer's specialized equipment to perform updates on the electronic devices and such processes were closed to the general public, causing inconvenience for users. In addition, whenever it is necessary to update various types of the electronic devices, the entire system has to be shut down and restarted. And during such processes, data loss may occur or other devices not subject to the update cannot be used.

In a prior art of Korean Patent Laid-Open Publication No. 10-2011-0136330, a method and a system for updating the firmware of an in-vehicle diagnostic module set up in conjunction with an ECU of a vehicle are disclosed. But it can be seen that the prior art does not disclose any additional configuration of simultaneously managing updates to the various types of the electronic devices and updating only an update-required device without affecting availability of other electronic devices not subject to the updates.

Therefore, in a case that the various types of the electronic devices are used together, for example, in a vehicle, there is a need for a method and a system capable of managing the updates of such electronic devices in an integrated manner and performing the updates only on the updated-required device without affecting the availability of other electronic devices not subject to the updates.

SUMMARY OF THE DISCLOSURE

It is an object of the present disclosure to solve all the aforementioned problems.

It is another object of the present disclosure to provide an extension service framework system with which a plurality of electronic devices are in conjunction modularly and provide a method of updates per module.

It is still another object of the present disclosure to prevent interruption in availability of services of other modules not subject to the updates by providing the method of the updates per module.

It is still yet another object of the present disclosure to allow an independent download service module to perform a download service related to update packages in an integrated manner, thereby improving security and efficiency.

In order to accomplish objects above and characteristic effects to be described later of the present disclosure, distinctive structures of the present disclosure are described as follows.

In accordance with one aspect of the present disclosure, there is provided a method for updating a specific update-required service module in an extension service framework, on condition that a specific update package of a new version to be used for updating the specific update-required service module among all update-required service modules has been stored in an update server, including steps of: (a) if a request message for a specific update on the specific update-required service module is acquired from a user device, wherein the user device has a user interface, an extension service framework server performing or supporting another device to perform a process of transmitting the request message for the specific update to a download service module, to thereby allow the download service module to transmit a request for a specific download of the specific update package, among all update packages, to the update server; (b) if the specific update package is downloaded from the update server and stored in a first storage in conjunction with the download service module and with the extension service framework server and if a request message for service installation is transmitted from the download service module, the extension service framework server performing or supporting another device to perform a process of verifying and unpacking the specific update package, to thereby acquire and store unpacked update files in the first storage; (c) the extension service framework server performing or supporting another device to perform (i) if the specific update-required service module is included in the extension service framework server, a process of allowing the specific update-required service module to install the unpacked update files stored in the first storage, to thereby update the specific update-required service module, and (ii) if the specific update-required service module is included in another device different from the extension service framework server, a process of transmitting the unpacked update files to a second storage in conjunction with the specific update-required service module and a process of allowing the specific update-required service module to install the unpacked update files stored in the second storage, to thereby update the specific update-required service module; and (d) the extension service framework server performing or supporting another device to perform a process of allowing the specific update-required service module to restart and a process of allowing the specific update-required service module to reconnect with the extension service framework server.

As one example, before the step of (a), the method further comprises steps of: (a0-1) if a request for service details on at least part of all the update-required service modules in conjunction with the extension service framework server is inputted through the user device and if a request message for the service details corresponding to the request for the service details is generated, the extension service framework server performing or supporting another device to perform (i) (i-1) a process of acquiring the request message for the service details from the user device, (i-2) a process of transmitting the request message for the service details to the download service module, to thereby allow the download service module to generate a response message for the service details by referring to information on the service details of the at least part of all the update-required service modules, (i-3) a process of acquiring the response message for the service details from the download service module, and (i-4) a process of transmitting the response message for the service details to the user device and (ii) if a request message for service version on the at least part of all the update-required service modules is generated by the user device, (ii-1) a process of acquiring the request message for the service version from the user device, (ii-2) a process of transmitting the request message for the service version to the download service module, to thereby allow the download service module to (1) transmit a request for latest version information on at least part of all the update packages, registered in the update server as corresponding to the at least part of all the update-required service modules, to the update server, (2) acquire the latest version information from the update server, and (3) generate a response message for the service version by referring to the latest version information, and (ii-3) a process of acquiring the response message for the service version and a process of transmitting the response message for the service version to the user device; and (a0-2) the extension service framework server performing or supporting another device to perform a process of allowing the user device to display information on at least part of the service details, the service version, whether latest update packages are registered in the update server, and current version information on the latest update packages respectively of the at least part of all the update-required service modules in conjunction with the extension service framework server by referring to the response message for the service details and the response message for the service version.

As one example, at the step of (b), after start of downloads of the at least part of all the update packages from the update server, the extension service framework server further performs or supports another device to perform (i) a process of acquiring one or more download related messages of the at least part of all the update packages from the download service module, wherein the download related messages include at least one of a start message for service download, a progress message for the service download, and a completion message for the service download, respectively generated according to the ongoing downloads and (ii) a process of transmitting the download related messages to the user device, to thereby allow the user device to display download related information on the at least part of all the update packages by referring to the download related messages, and wherein, at the step of (c), after start of installation for updates of the at least part of all the update-required service modules, the extension service framework server further performs or supports another device to perform (i) a process of acquiring one or more installation related messages on the unpacked update files, acquired by unpacking the at least part of all the update packages, from the at least part of all the update-required service modules whose updates have started, wherein the installation related messages include at least one of a start message for the service installation, a progress message for the service installation, and a completion message for the service installation, respectively generated according to the ongoing installation of at least part of the unpacked update files and (ii) a process of transmitting the installation related messages to the user device, to thereby allow the user device to display installation related information on the at least part of the unpacked update files by referring to the installation related messages.

As one example, the extension service framework server further performs or supports another device to perform (i) a process of transmitting a request message for a specific download service to the download service module, wherein the request message for the specific download service includes at least one of the request message for the service details, the request message for the service version, and the request message for service update, related to the updates of the at least part of all the update-required service modules, to thereby allow the download service module to (i-1) parse the request message for the specific download service, (i-2) extract information on a specific function to be used in the specific download service, wherein the information on the specific function includes identification information on the specific function and category information on the specific function, and (i-3) generate a response message for the specific download service by referring to the information on the specific function, wherein the response message for the specific download service includes, as results of executing the specific download service, at least one of the response message for the service details, the response message for the service version, and a response message for the service update, respectively corresponding to the request message for the service details, the request message for the service version, and the request message for the service update and (ii) a process of acquiring the response message for the specific download service.

As one example, at the step of (c), in case the unpacked update files are transmitted to the second storage, the extension service framework server performs or supports another device to perform (i) a process of allowing the specific update-required service module to generate temporary path information in the second storage and (ii) after the unpacked update files are stored in a location represented by the temporary path information, a process of allowing the specific update-required service module to install the unpacked update files.

As one example, at the step of (c), if the unpacked update files are stored in the first storage or in the second storage, the extension service framework server further performs or supports another device to perform a process of allowing the specific update-required service module to store copies of (1) specific files currently in use and (2) configuration files, respectively corresponding to the unpacked update files.

As one example, at the step of (b), if the specific update package is downloaded and stored in the first storage, the extension service framework server performs or supports another device to perform (i) a process of allowing the specific update-required service module to generate a subject message including (1) service execution information and (2) installation path information representing a location where the unpacked update files are to be installed, (ii) a process of acquiring the subject message, and (iii) a process of unpacking the specific update package if the service execution information and the installation path information included in the subject message are determined as valid.

As one example, the first storage, at least part of which is encrypted and managed as a secure area, is in conjunction with a security module included in the extension service framework server and wherein information on at least one cryptographic key, to be used for encrypting or decrypting at least one of the secure area and the specific update package stored in the secure area, is managed by the security module.

As one example, at the step of (c), if a failure is detected during installation of the unpacked update files, the extension service framework server performs or supports another device to perform a process of generating an error message for the service installation including information on the failure and a process of transmitting the error message for the service installation to the user device, to thereby allow the user device to display the information on the failure by referring to the error message for the service installation.

As one example, an OMA-DM (Open Mobile Alliance Device Management) protocol is used for communication between the download service module and the update server, and wherein the download service module includes an OMA-DM client engine for transmitting and receiving information to be used for the specific download of the specific update package.

In accordance with another aspect of the present disclosure, there is provided an extension service framework server for updating a specific update-required service module in an extension service framework, on condition that a specific update package of a new version to be used for updating the specific update-required service module among all update-required service modules has been stored in an update server, including: at least one memory that stores instructions; and at least one processor configured to execute the instructions to perform or support another device to perform: (I) if a request message for a specific update on the specific update-required service module is acquired from a user device, wherein the user device has a user interface, a process of transmitting the request message for the specific update to a download service module, to thereby allow the download service module to transmit a request for a specific download of the specific update package, among all update packages, to the update server, (II) if the specific update package is downloaded from the update server and stored in a first storage in conjunction with the download service module and with the extension service framework server and if a request message for service installation is transmitted from the download service module, a process of verifying and unpacking the specific update package, to thereby acquire and store unpacked update files in the first storage, (III) (i) if the specific update-required service module is included in the extension service framework server, a process of allowing the specific update-required service module to install the unpacked update files stored in the first storage, to thereby update the specific update-required service module, and (ii) if the specific update-required service module is included in another device different from the extension service framework server, a process of transmitting the unpacked update files to a second storage in conjunction with the specific update-required service module and a process of allowing the specific update-required service module to install the unpacked update files stored in the second storage, to thereby update the specific update-required service module, and (IV) a process of allowing the specific update-required service module to restart and a process of allowing the specific update-required service module to reconnect with the extension service framework server.

As one example, before the process of (I), the processor further performs or supports another device to perform: (I0-1) if a request for service details on at least part of all the update-required service modules in conjunction with the extension service framework server is inputted through the user device and if a request message for the service details corresponding to the request for the service details is generated, (i) (i-1) a process of acquiring the request message for the service details from the user device, (i-2) a process of transmitting the request message for the service details to the download service module, to thereby allow the download service module to generate a response message for the service details by referring to information on the service details of the at least part of all the update-required service modules, (i-3) a process of acquiring the response message for the service details from the download service module, and (i-4) a process of transmitting the response message for the service details to the user device and (ii) if a request message for service version on the at least part of all the update-required service modules is generated by the user device, (ii-1) a process of acquiring the request message for the service version from the user device, (ii-2) a process of transmitting the request message for the service version to the download service module, to thereby allow the download service module to (1) transmit a request for latest version information on at least part of all the update packages, registered in the update server as corresponding to the at least part of all the update-required service modules, to the update server, (2) acquire the latest version information from the update server, and (3) generate a response message for the service version by referring to the latest version information, and (ii-3) a process of acquiring the response message for the service version and a process of transmitting the response message for the service version to the user device and (I0-2) a process of allowing the user device to display information on at least part of the service details, the service version, whether latest update packages are registered in the update server, and current version information on the latest update packages respectively of the at least part of all the update-required service modules in conjunction with the extension service framework server by referring to the response message for the service details and the response message for the service version.

As one example, at the process of (II), after start of downloads of the at least part of all the update packages from the update server, the processor further performs or supports another device to perform (i) a process of acquiring one or more download related messages of the at least part of all the update packages from the download service module, wherein the download related messages include at least one of a start message for service download, a progress message for the service download, and a completion message for the service download, respectively generated according to the ongoing downloads and (ii) a process of transmitting the download related messages to the user device, to thereby allow the user device to display download related information on the at least part of all the update packages by referring to the download related messages, and wherein, at the process of (III), after start of installation for updates of the at least part of all the update-required service modules, the processor further performs or supports another device to perform (i) a process of acquiring one or more installation related messages on the unpacked update files, acquired by unpacking the at least part of all the update packages, from the at least part of all the update-required service modules whose updates have started, wherein the installation related messages include at least one of a start message for the service installation, a progress message for the service installation, and a completion message for the service installation, respectively generated according to the ongoing installation of at least part of the unpacked update files and (ii) a process of transmitting the installation related messages to the user device, to thereby allow the user device to display installation related information on the at least part of the unpacked update files by referring to the installation related messages.

As one example, the processor further performs or supports another device to perform (i) a process of transmitting a request message for a specific download service to the download service module, wherein the request message for the specific download service includes at least one of the request message for the service details, the request message for the service version, and the request message for service update, related to the updates of the at least part of all the update-required service modules, to thereby allow the download service module to (i-1) parse the request message for the specific download service, (i-2) extract information on a specific function to be used in the specific download service, wherein the information on the specific function includes identification information on the specific function and category information on the specific function, and (i-3) generate a response message for the specific download service by referring to the information on the specific function, wherein the response message for the specific download service includes, as results of executing the specific download service, at least one of the response message for the service details, the response message for the service version, and a response message for the service update, respectively corresponding to the request message for the service details, the request message for the service version, and the request message for the service update and (ii) a process of acquiring the response message for the specific download service.

As one example, at the process of (III), in case the unpacked update files are transmitted to the second storage, the processor performs or supports another device to perform (i) a process of allowing the specific update-required service module to generate temporary path information in the second storage and (ii) after the unpacked update files are stored in a location represented by the temporary path information, a process of allowing the specific update-required service module to install the unpacked update files.

As one example, at the process of (III), if the unpacked update files are stored in the first storage or in the second storage, the processor further performs or supports another device to perform a process of allowing the specific update-required service module to store copies of (1) specific files currently in use and (2) configuration files, respectively corresponding to the unpacked update files.

As one example, at the process of (II), if the specific update package is downloaded and stored in the first storage, the processor performs or supports another device to perform (i) a process of allowing the specific update-required service module to generate a subject message including (1) service execution information and (2) installation path information representing a location where the unpacked update files are to be installed, (ii) a process of acquiring the subject message, and (iii) a process of unpacking the specific update package if the service execution information and the installation path information included in the subject message are determined as valid.

As one example, the first storage, at least part of which is encrypted and managed as a secure area, is in conjunction with a security module included in the extension service framework server and wherein information on at least one cryptographic key, to be used for encrypting or decrypting at least one of the secure area and the specific update package stored in the secure area, is managed by the security module.

As one example, at the process of (III), if a failure is detected during installation of the unpacked update files, the processor performs or supports another device to perform a process of generating an error message for the service installation including information on the failure and a process of transmitting the error message for the service installation to the user device, to thereby allow the user device to display the information on the failure by referring to the error message for the service installation.

As one example, an OMA-DM (Open Mobile Alliance Device Management) protocol is used for communication between the download service module and the update server, and wherein the download service module includes an OMA-DM client engine for transmitting and receiving information to be used for the specific download of the specific update package.

BRIEF DESCRIPTION OF THE DRAWINGS

The above and other objects and features of the present invention will become apparent from the following description of preferred embodiments given in conjunction with the accompanying drawings, in which:

FIGS. 5A to 5E are drawings schematically illustrating steps performed in updating processes of the specific update-required service module in accordance with one example embodiment of the present disclosure.

DETAILED DESCRIPTION OF THE PREFERRED EMBODIMENTS

Figure 1:
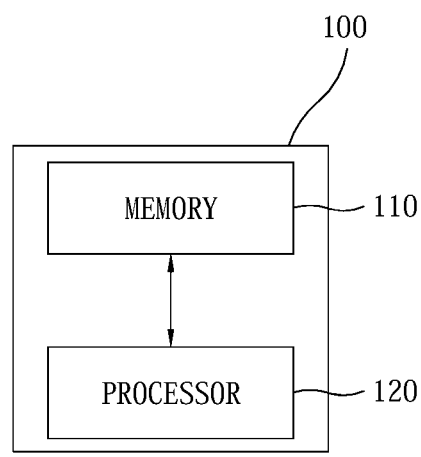
FIG. 1 is a drawing schematically illustrating an extension service framework server which manages all update-required service modules in an extension service framework in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

FIG. 1 is a drawing schematically illustrating an extension service framework server which manages all update-required service modules in an extension service framework in accordance with one example embodiment of the present disclosure.

By referring to FIG. 1, the extension service framework server 100 may include a memory 110 and a processor 120. Herein, the extension service framework server 100 may manage all the update-required service modules in the extension service framework. Herein, the memory 110 may store instructions for the processor 120, and the instructions may be code generated to allow the extension service framework server 100 to be operated in a specific way, and may be stored in the memory usable or readable by a computer, i.e., a programmable data processing device, or in the computer. The instructions may execute the processes described in the present disclosure.

And the processor 120 may include hardware configuration of MPU (Micro Processing Unit) or CPU (Central Processing Unit), cache memory, data bus, etc. Additionally, any OS (operating system) and software configuration of applications that achieve specific purposes may further be included.

Next, the extension service framework server 100 may be in conjunction with at least one storage to be used for a file system and for storing update packages. Herein, the storage may include at least one of a flash memory type, a hard disk type, a multimedia card micro type, a card type memory (for example, SD or XD memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. However, the scope of the present disclosure is not limited to these examples and may include all media capable of storing data. Alternatively, the storage may be included inside the extension service framework server 100, or may be prepared separately from the extension service framework server 100 to transmit data or record received data as the case may be.

Figure 2:
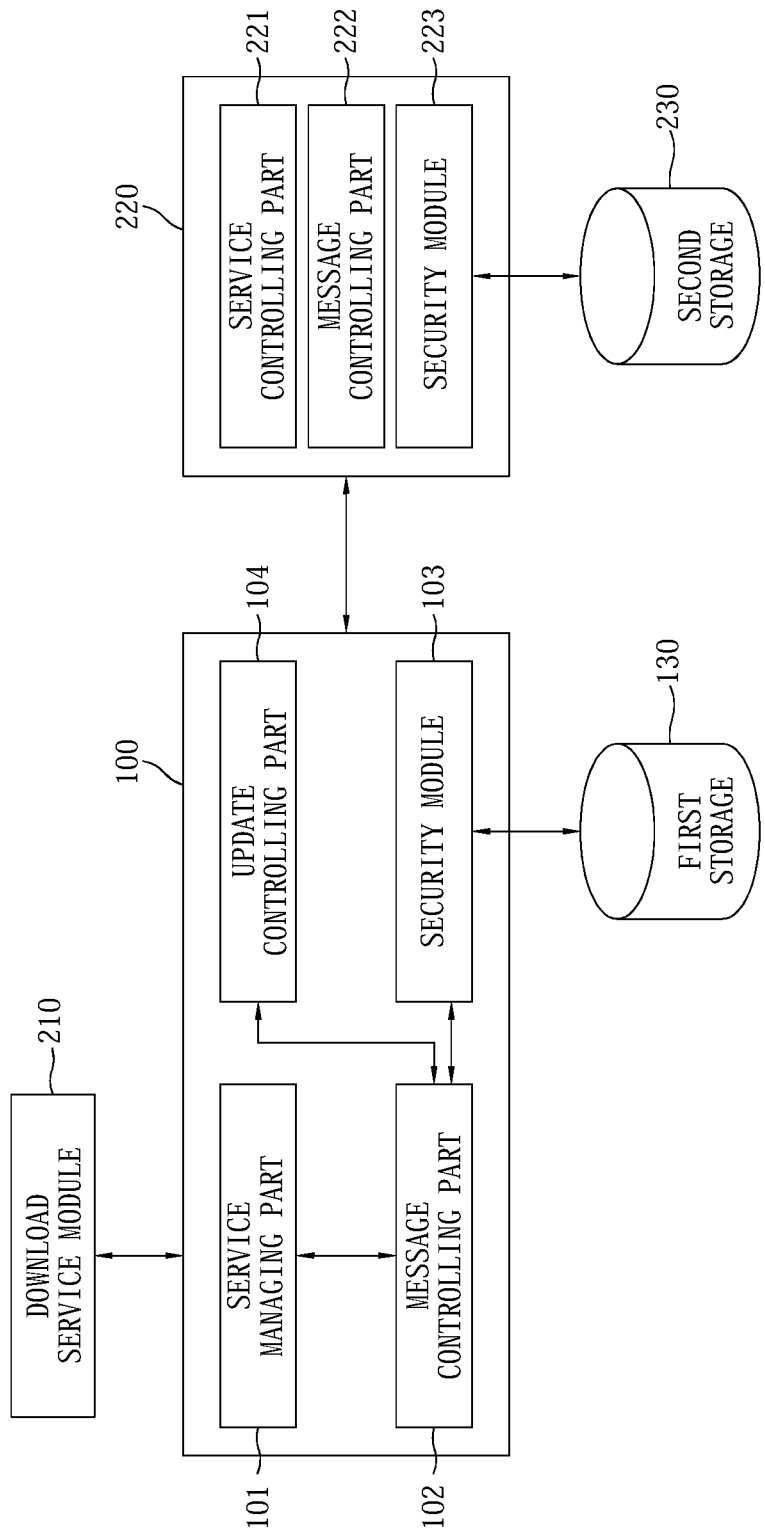
FIG. 2 is a drawing schematically illustrating the extension service framework server and a specific update-required service module in accordance with one example embodiment of the present disclosure.

FIG. 2 is a drawing schematically illustrating the extension service framework server and a specific update-required service module in accordance with one example embodiment of the present disclosure.

By referring to FIG. 2, the extension service framework server 100 may include (1) a service managing part 101 for managing each of all the update-required service modules, in conjunction, (2) a message controlling part 102 for controlling messages transmitted and received during such management processes of the service managing part 101, and (3) an update controlling part 104 for controlling updates of at least part of all the update-required service modules. Also, a first storage 130 may be in conjunction with the extension service framework server 100. Herein, the first storage 130 may be provided inside or outside the extension service framework server 100 and may store a file system used by the extension service framework server 100. In addition to this, a security module 103 to be used for managing encryption and decryption of the first storage 130 may further be included. Accordingly, security is managed through the encryption and the decryption of at least part of (1) a secure area in at least part of the first storage 130 and (2) files stored in the first storage 130. Herein, an asymmetric/symmetric key based encryption algorithm may be used for the encryption and the decryption, but the scope of the present disclosure is not limited thereto. And at least one cryptographic key used in the algorithm may be managed by the security module 103.

Next, the specific update-required service module 220 may include (1) a service controlling part 221 in conjunction with the extension service framework server 100, (2) a message controlling part 222 for managing messages transmitted to and received from the extension service framework server 100, and (3) a second storage 230 for storing a file system of the specific update-required service module 220. Herein, as another example, the second storage 230 may be external to the specific update-required service module 220. Also, as another example, the specific update-required service module 220 may further include a security module 223 for managing the encryption and the decryption of the second storage 230.

And, if a request message for service installation, to be used for updating the specific update-required service module 220, is acquired from a download service module 210 which performs processes related to a specific download of a specific update package to be used for a specific update of the specific update-required service module 220, then the service managing part 101 may transmit the request message for the service installation to the message controlling part 102 to allow the message controlling part 102 to process the request message for the service installation. And then, the message controlling part 102 may transmit the request message for the service installation to the update controlling part 104 to allow the update controlling part 104 to verify and decrypt the downloaded specific update package and unpack the decrypted specific update package. Herein, the specific update package may include executable binary files to run the service, service description files, service configuration files, service icon files, and service xml files, all of which may be acquired by unpacking the specific update package.

Then, the extension service framework server 100 may perform or support another device to perform a process of allowing the specific update-required service module 220 to install the unpacked update files, to thereby update the specific update-required service module 220. And if the specific update-required service module is updated, the extension service framework server 100 may perform or support another device to perform a process of allowing the specific update-required service module 220 to restart and a process of allowing the specific update-required service module 220 to reconnect with the extension service framework server 100.

Figure 3:
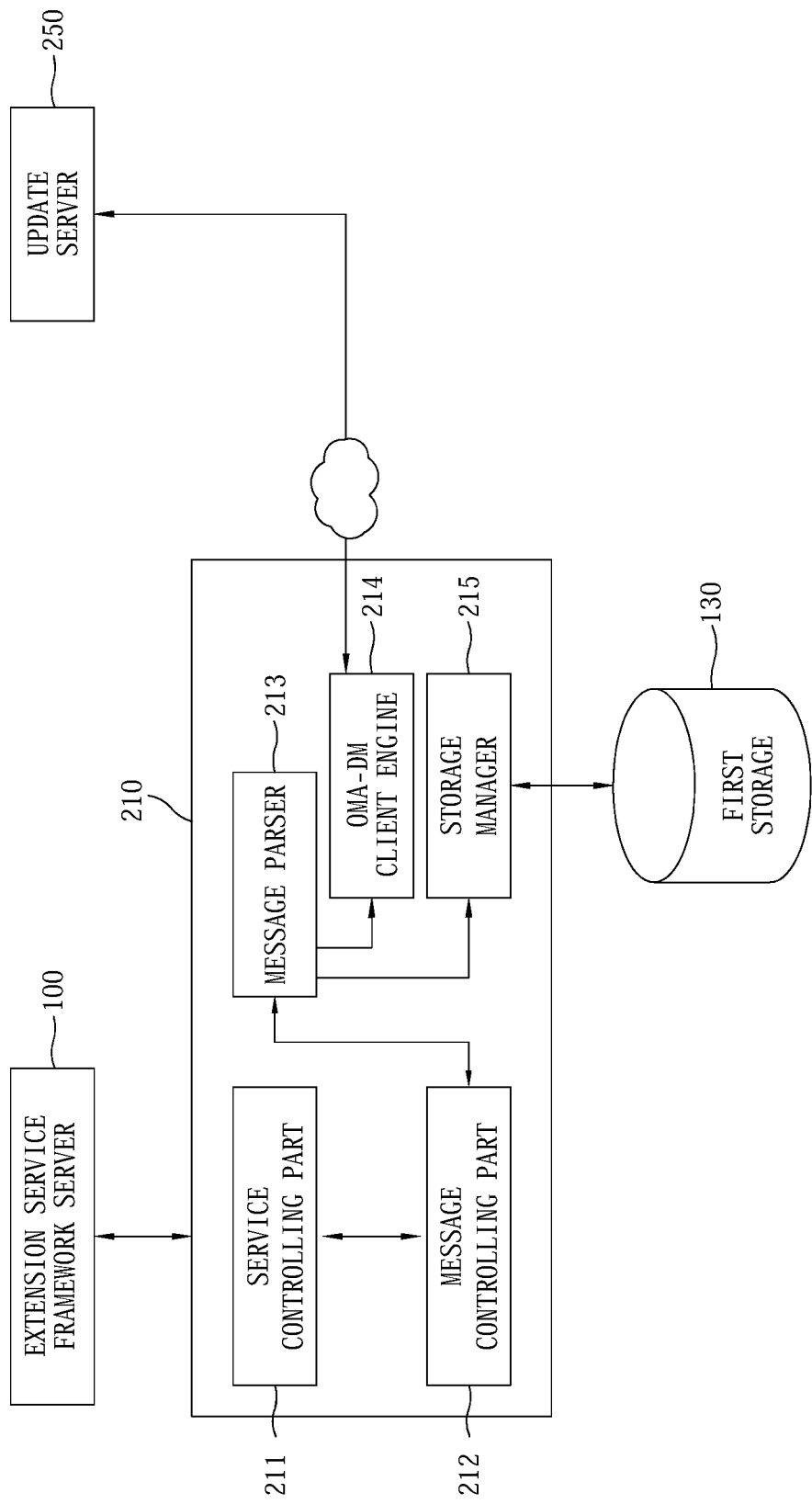
FIG. 3 is a drawing schematically illustrating the download service module which performs a download service related to downloads of update packages in accordance with one example embodiment of the present disclosure.

FIG. 3 is a drawing schematically illustrating the download service module which performs a download service related to downloads of the update packages in accordance with one example embodiment of the present disclosure.

By referring to FIG. 3, the download service module 210 may include (1) a service controlling part 211 for transmitting and receiving information and thus controlling the download service in conjunction with the extension service framework server 100, (2) a message controlling part 212 for controlling messages transmitted and received during such controlling processes of the service controlling part 211, and (3) a message parser 213 for extracting information on a specific function to be used in a specific download service by parsing the messages transmitted from the message controlling part 212. Herein, the information on the specific function may include identification information on the specific function and category information on the specific function. For example, the information on the specific function may include (1) a URI (Uniform Resource Identifier), corresponding to the specific function, which is a unique identifier of an API (Application Program Interface) corresponding to the specific function and (2) category information on the API, but the scope of the present disclosure is not limited thereto, and the information on the specific function may differ as the case may be.

Also, in order to execute the specific download service, the download service module 210 may be in conjunction with an update server 250 by a communication protocol. Herein, the update server 250 may store the specific update package to be used for updating the specific update-required service module 220 and may transmit and receive information related to the specific update package. Further, the communication protocol may be an OMA-DM (Open Mobile Alliance Device Management) protocol, and in that case, the download service module 210 may include an OMA-DM client engine 214, for transmitting and receiving information, in conjunction with the update server 250. And, the specific update package transmitted from the update server 250 may be stored in the first storage 130. Herein, the first storage 130 may be in conjunction with the download service module 210 and may further be in conjunction with the extension service framework server 100. And in this case, the download service module 210 may further include a storage manager 215 to be used for managing the specific update package and the unpacked update files acquired by unpacking the specific update package. Herein, the storage manager 215 may be in conjunction with the first storage 130.

Figure 4:
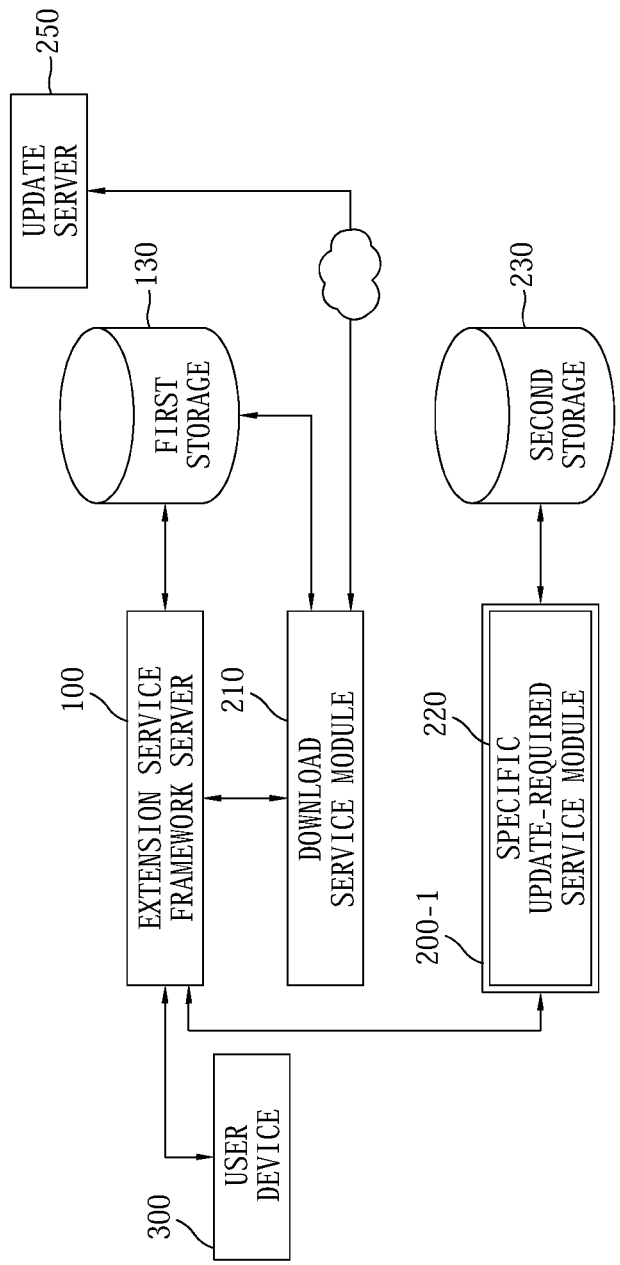
FIG. 4 is a drawing schematically illustrating an entire system of the extension service framework in accordance with one example embodiment of the present disclosure.

FIG. 4 is a drawing schematically illustrating an entire system of the extension service framework in accordance with one example embodiment of the present disclosure.

By referring to FIG. 4, an extension service framework system may be configured to include the extension service framework server 100, the download service module 210, and the specific update-required service module 220, as described above.

Herein, FIG. 4 illustrates the single specific update-required service module 220 and a single service device 200-1 including the specific update-required service module 220. However, the extension service framework server 100 may simultaneously manage a plurality of service devices included in the extension service framework server 100. Further, each of the plurality of service devices may include each of service modules to provide each of services and may include its corresponding each of storages.

And, the extension service framework server 100 may be connected with a user device 300. Herein, the user device 300 may have a user interface capable of allowing a user to interact with the extension service framework server 100. Also, the extension service framework server 100 may allow the user device 300 to display update related information generated during the specific update of the specific update-required service module 220. For example, the user device 300 may be an AVN (Audio, Video, and Navigation) device. And the user device 300 may display information on at least part of service details, service version, whether latest update packages are registered in the update server 250, and current version information on the latest update packages respectively of the at least part of all the update-required service modules in conjunction with the extension service framework server 100. Herein, the extension service framework server 100 may be set up in a vehicle of the user.

FIGS. 5A to 5E are drawings schematically illustrating steps performed in updating processes of the specific update-required service module 220 in accordance with one example embodiment of the present disclosure.

Figure 5A:
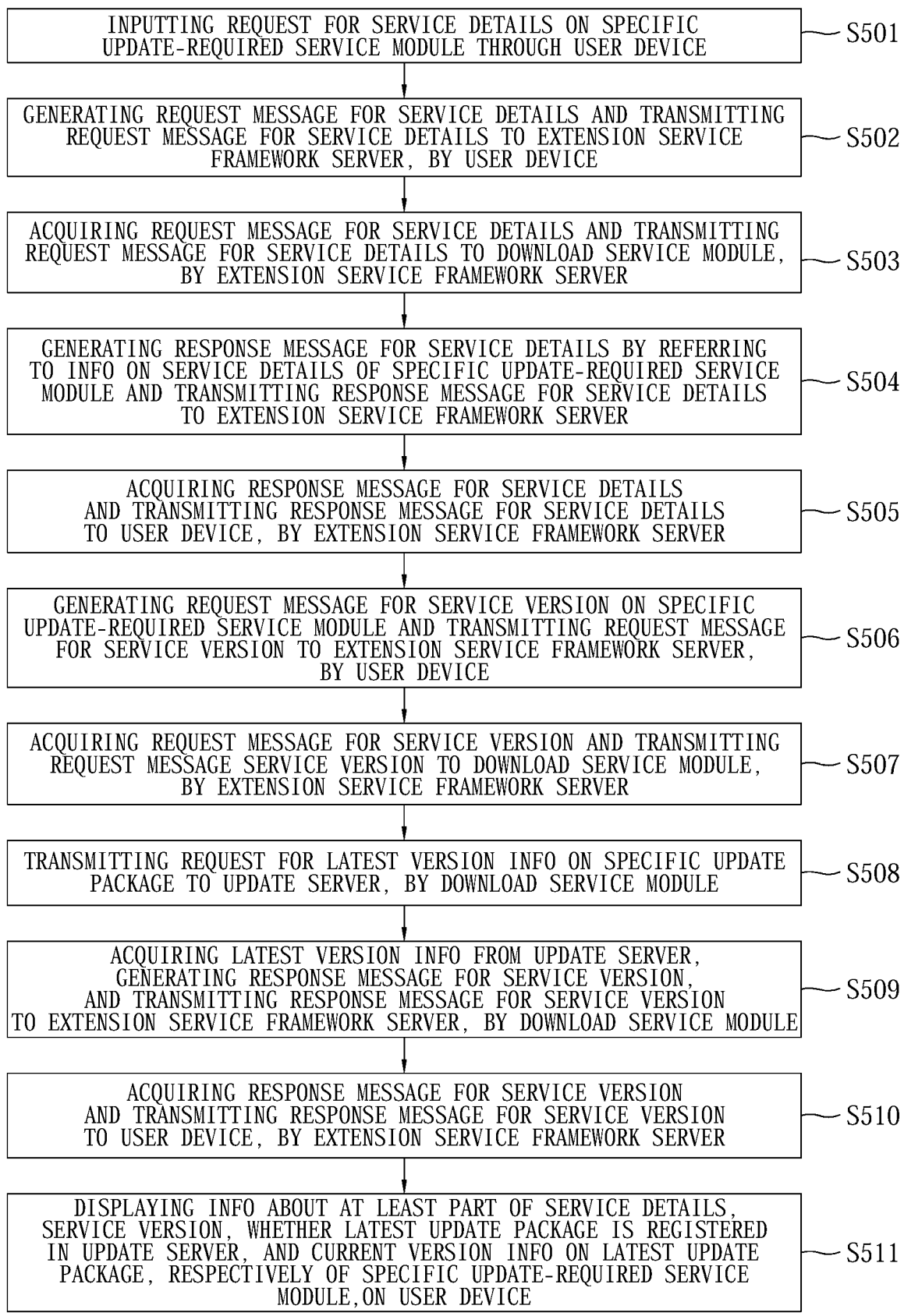

FIG. 5A shows processes of displaying, on the user device 300, information on at least part of the service details, the service version, whether a latest update package is registered in the update server 250, and the current version information on the latest update package, respectively of the specific update-required service module 220, before updating the specific update-required service module 220 among all the update-required service modules in conjunction with the extension service framework server 100. In detail, if a request for the service details on the specific update-required service module 200 is inputted through the user device 300 at a step of S501, a request message for the service details corresponding to the request for the service details may be generated by the user device 300, and the request message for the service details may be transmitted to the extension service framework server 100 at a step of S502.

Then, the extension service framework server 100 may perform or support another device to perform (i) a process of acquiring the request message for the service details from the user device 300 and (ii) a process of transmitting the request message for the service details to the download service module 210 at a step of S503. Then, the download service module 210 may (i) generate a response message for the service details by referring to information on the service details of the specific update-required service module and (ii) transmit the response message for the service details to the extension service framework server 100 at a step of S504. Herein, the information on the service details may be information on history of installation and updates of the specific update-required service module. Further, the information on the service details may have been stored in the first storage 130, or as another example, may have been stored in another database, but the scope of the present disclosure is not limited thereto.

Next, the extension service framework server 100 may perform or support another device to perform a process of acquiring the response message for the service details from the download service module 210 and a process of transmitting the response message for the service details to the user device 300 at a step of S505.

And, the user device 300 may (i) generate a request message for the service version on the specific update-required service module in order to request latest service version to which the specific update-required service module can be updated and (ii) transmit the request message for the service version to the extension service framework server 100 at a step of S506.

Then the extension service framework server 100 may perform or support another device to perform (i) a process of acquiring the request message for the service version from the user device 300 and (ii) a process of transmitting the request message for the service version to the download service module 210 at a step of S507. And the download service module 210 may (i) transmit a request for latest version information on the specific update package, registered in the update server 250 as corresponding to the specific update-required service module, to the update server 250 at a step of S508, (ii) acquire the latest version information from the update server 250, (iii) generate a response message for the service version by referring to the latest version information, and (iv) transmit the response message for the service version to the extension service framework server 100 at a step of S509.

Then, the extension service framework server 100 may perform or support another device to perform a process of acquiring the response message for the service version and a process of transmitting the response message for the service version to the user device 300 at a step of S510.

As one example, FIG. 5A illustrates that the steps from S501 to S505 related to the request and the response for the service details of the specific update-required service module are performed and then the steps from S506 to S510 related to the request and the response for the service version of the specific update-required service module are performed. However, as another example, the steps from S506 to S510 may be performed while the steps from S501 to S505 are performed.

If the response message for the service details and the response message for the service version are transmitted to the user device 300 through the steps described above, the extension service framework server 100 may perform or support another device to perform a process of allowing the user device 300 to display the information on at least part of the service details, the service version, whether the latest update package is registered in the update server 250, and the current version information on the latest update package, respectively of the specific update-required service module at a step of S511. Herein, the extension service framework server 100 may perform or support another device to perform a process of determining that the specific update-required service module does not require the specific update if no newer version of an update package for the specific update-required service module is determined as present in the update server 250.

FIG. 5B shows processes of displaying information related to the specific download on the user device 300 if the specific update package is downloaded. In detail, if a request for service update on the specific update-required service module is inputted through the user device 300 at a step of S520, then a request message for the service update, corresponding to the request for the service update, may be generated by the user device 300, and the request message for the service update may be transmitted to the extension service framework server 100 at a step of S521.

Then, the extension service framework server 100 may perform or support another device to perform (i) a process of acquiring the request message for the service update and (ii) a process of transmitting the request message for the service update to the download service module 210 at a step of S522. And the download service module 210 may transmit a request for the specific download of the specific update package to the update server 250 by referring to the request message for the service update, at a step of S523.

Then, after start of the specific download from the update server 250 at a step of S524, one or more download related messages may be generated by the download service module 210, and the download related messages may be transmitted to the extension service framework server 100 at a step of S525. Herein, the download related messages may include at least one of a start message for service download, a progress message for the service download, and a completion message for the service download, respectively generated according to the ongoing specific download.

Next, the extension service framework server 100 may perform or support another device to perform a process of acquiring the download related messages and a process of transmitting the download related messages to the user device 300 at a step of S526, to thereby allow the user device 300 to display download related information on the specific update package by referring to the download related messages at a step of S527.

Figure 5D:
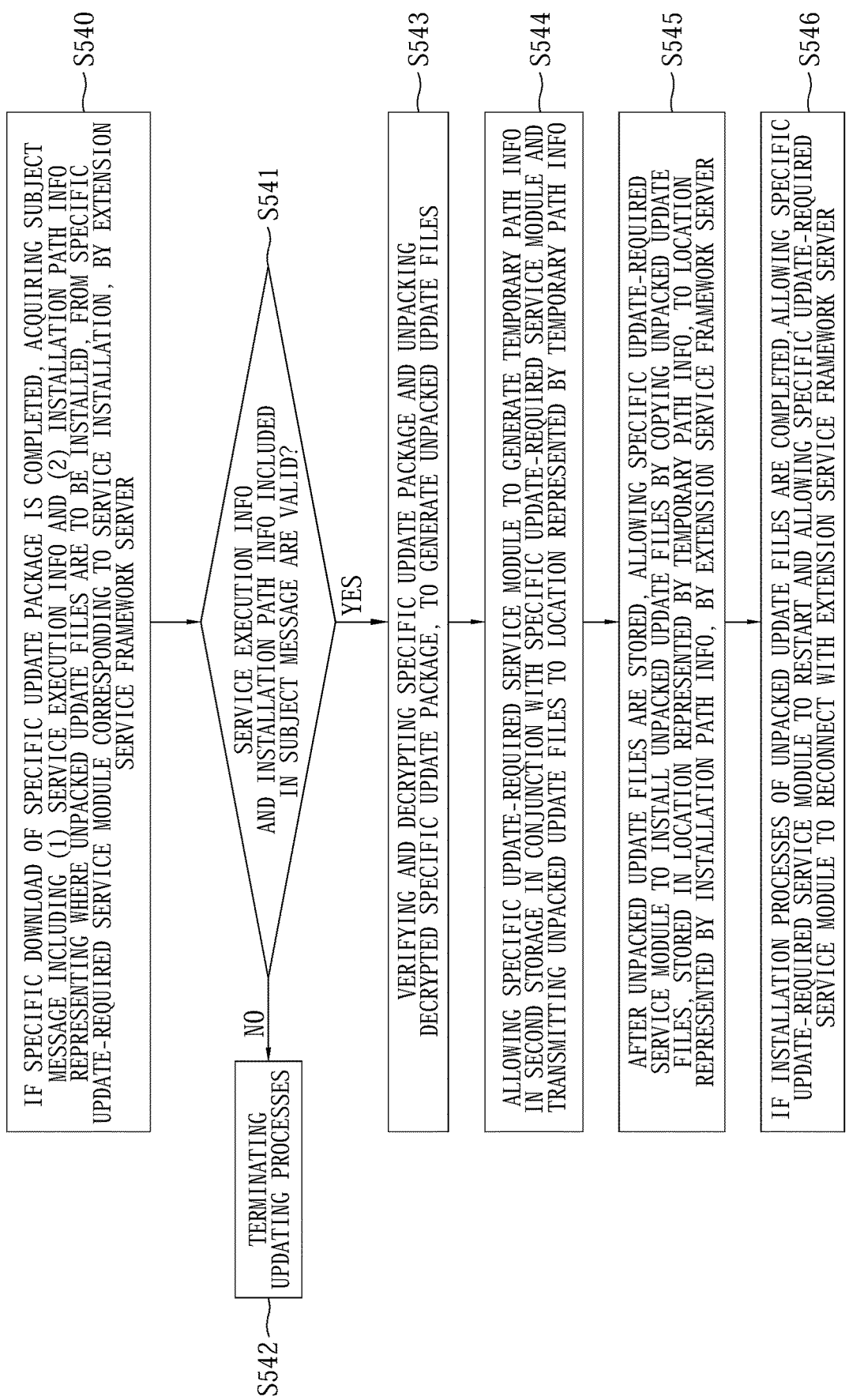

FIGS. 5C and 5D shows installation processes of the specific update package after the specific download has been completed. Herein, the installation processes have two cases, one in which the specific update-required service module is included in the extension service framework server 100 and the other in which the specific update-required service module is included in another device different from the extension service framework server 100.

FIG. 5C shows installation processes of the specific update package for the specific update-required service module in a case of an in-bound service in which the specific update-required service module is included in the extension service framework server 100. Specifically, if the specific download of the specific update package is completed, the request message for the service installation may be transmitted from the download service module 210 to the extension service framework server 100. Then, the extension service framework server 100 may perform or support another device to perform a process of acquiring a subject message including (1) service execution information and (2) installation path information representing where the unpacked update files are to be installed, from the specific update-required service module corresponding to the service installation at a step of S530.

Then, the extension service framework server 100 may perform or support another device to perform a process of determining whether the service execution information and the installation path information included in the subject message are valid at a step of S531. If the service execution information and the installation path information included in the subject message are determined as invalid then the updating processes may be terminated at a step of S532 and if the service execution information and the installation path information included in the subject message are determined as valid then the extension service framework server 100 may perform or support another device to perform a process of verifying and decrypting the specific update package and a process of unpacking the decrypted specific update package, to thereby acquire the unpacked update files at a step of S533.

Then the extension service framework server 100 may perform or support another device to perform (i) a process of allowing the specific update-required service module to install the unpacked update files by copying the unpacked update files to a location represented by the installation path information in the first storage at a step of S534 and (ii) after the installation process of the unpacked update files is completed, a process of allowing the specific update-required service module to restart and a process of allowing the specific update-required service module to reconnect with the extension service framework server 100 at a step of S535. Herein, in order for the restart and reconnection of the specific update-required service module, the extension service framework server 100 may control specific processes running in conjunction with the specific update-required service module or may support another device to control the specific processes, to thereby allow the specific processes to be terminated forcefully or to be re-executed.

FIG. 5D shows installation processes of the specific update package for the specific update-required service module in a case of an out-bound service in which the specific update-required service module is included in another device different from the extension service framework server 100. Specifically, if the specific download is completed, the request message for the service installation may be transmitted from the download service module 210 to the extension service framework server 100. Then, the extension service framework server 100 may perform or support another device to perform a process of acquiring the subject message including (1) the service execution information and (2) the installation path information from the specific update-required service module corresponding to the service installation at a step of S540.

Then, the extension service framework server 100 may perform or support another device to perform a process of determining whether the service execution information and the installation path information included in the subject message are valid at a step of S541. If the service execution information and the installation path information included in the subject message are determined as invalid then the updating processes may be terminated at a step of S542 and if the service execution information and the installation path information included in the subject message are determined as valid then the extension service framework server 100 may perform or support another device to perform a process of verifying and decrypting the specific update package and a process of unpacking the decrypted specific update package, to thereby acquire the unpacked update files at a step of S543.

Then, the extension service framework server 100 may perform or support another device to perform (i) a process of allowing the specific update-required service module 220 to generate temporary path information in the second storage 230 in conjunction with the specific update-required service module 220 and (ii) a process of transmitting the unpacked update files to a location represented by the temporary path information at a step of S544. After the unpacked update files are stored, the extension service framework server 100 may perform or support another device to perform (i) a process of allowing the specific update-required service module 220 to install the unpacked update files by copying the unpacked update files, stored in the location represented by the temporary path information, to the location represented by the installation path information at a step of S545 and (ii) if the installation processes of the unpacked update files are completed, a process of allowing the specific update-required service module 220 to restart and a process of allowing the specific update-required service module 220 to reconnect with the extension service framework server 100 at a step of S546. Herein, as described by referring to FIG. 5C, in order for the restart and reconnection of the specific update-required service module, the extension service framework server 100 may restart and reconnect the specific processes running in conjunction with the specific update-required service module or may support another device to restart and reconnect the specific processes.

Figure 5E:
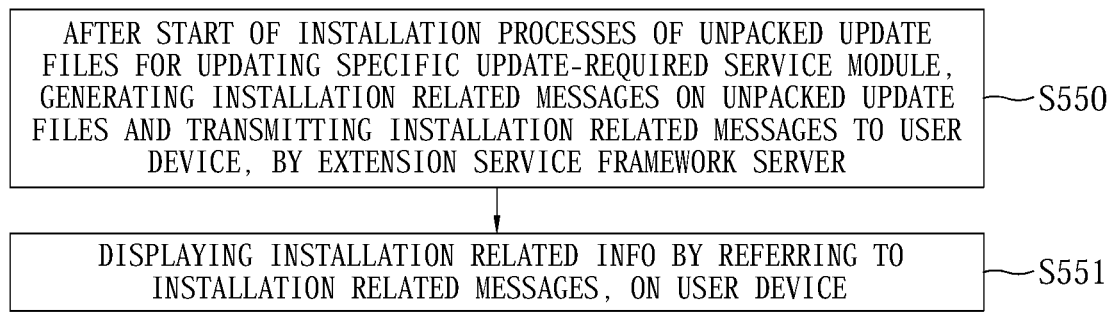

FIG. 5E shows processes of displaying installation related information about the unpacked update files on the user device 300, after start of the installation processes of the unpacked update files acquired by unpacking the downloaded specific update package. In detail, after the start of the installation processes of the unpacked update files for updating the specific update-required service module 220, the extension service framework server 100 may perform or support another device to perform (i) a process of generating one or more installation related messages on the unpacked update files and (ii) a process of transmitting the installation related messages to the user device 300 at a step of S550, to thereby allow the user device 300 to display the installation related information by referring to the installation related messages at a step of S551. Herein, the installation related messages may include at least one of a start message for the service installation, a progress message for the service installation, a completion message for the service installation, and an error message for the service installation, respectively generated according to the ongoing installation of at least part of the unpacked update files.

As one example, if a failure is detected during the installation of the unpacked update files, the extension service framework server 100 may perform or support another device to perform a process of generating the error message for the service installation including information on the failure and a process of transmitting the error message for the service installation to the user device 300, to thereby allow the user device 300 to display the information on the failure by referring to the error message for the service installation.

Also, the messages transmitted and received as described above during the updating processes of the specific update-required service module 220 may be as follows.

TABLE 1

| | Message | Examples of message |
|---|---|---|
| 1 | Request message for service details | { "uri" : "/service/download/services/installed", "api_type" : GET } |
| 2 | Response message for service details | { "uri": "/service/download/services/installed", "api_type": DATA, "data": { "response": "Success", "value": [ { "SHORT_NAME": "Extension Service", "ID":"http://www.obigo.com/OBIGO/ESF/agent", "VERSION": "0.2.123" }, { "SHORT_NAME": "Vehicle Service", "ID":"http://www.obigo.com/OBIGO/ESF/vehicle", "VERSION": "0.2.123" }, { "SHORT_NAME": "TestMenu Service", "ID":"http://www.obigo.com/OBIGO/ESF/testmenu", "VERSION": "0.2.123" } ]}} |
| 3 | Request message for service version | { "uri" : "/service/download/services/version", "api_type" : GET } |
| 4 | Response message for service version | { "uri": "/service/download/services/version", "api_type": 0, "data": { "response": "Success", "value": [ { "BACKGROUND": false, "BLACKLIST": false, "DESCRIPTION": "test", "FILE_SIZE": 2946175, "ICON": "icon_1530862375287.png", "ID": "http://www.obigo.com/OBIGO/ESF/agent", "NAME": "Extension Service", "REMOVE": false, "REQUIRED": false, "SHORT_NAME": "Extension Service", "VERSION": "1.0.12" }, { ... }]}} |
| 5 | Request message for service update | { "uri" : "/service/download/services/update", "api_type" : SET, "data": { "value": [ { "ID": "http://www.obigo.com/OBIGO/ESF/vehicle", "VERSION": "1.0.7" } ]}} |
| 6 | Start message for service download | { "uri": "/service/download/services/update/status", "api_type": 0, "data": { |

TABLE 1-continued

| Message | Examples of message |
|---|---|
| | "response": "Success",<br>"value": {<br>"ID": .obigo.com/OBIGO/ESF/vehicle",<br>"STATUS": "DownloadStart"<br>} }<br>} |
| 7 Progress message for service download | {<br>"uri": "/service/download/services/update/status",<br>"api_type": 0,<br>"data": {<br>"response": "Success",<br>"value": {<br>"ID": "http://www.obigo.com/OBIGO/ESF/vehicle",<br>"PERCENT": 23,<br>"STATUS": "DownloadProgress"<br>} }<br>} |
| 8 Completion message for service download | {<br>"uri": "/service/download/services/update/status",<br>"api_type": 0,<br>"data": {<br>"response": "Success",<br>"value": {<br>"ERROR": 0,<br>"ID": "http://www.obigo.com/posco/C300/extension/vehicle",<br>"STATUS": "DownloadEnded"<br>}<br>}<br>} |
| 9 Cancellation message for service update | {"uri" : "/service/download/services/update/stop",<br>"api_type" : SET,<br>"data":{<br>"ID": "http://www.obigo.com/OBIGO/ESF/vehicle",<br>} } |
| 10 Request message for service installation | {"uri" : "/service/install/service",<br>"api_type" : SET,<br>"data":{<br>"ID": "http://www.obigo.com/OBIGO/ESF/vehicle",<br>"PACKAGE-INFO": "secure-package info",<br>} } |
| 11 Start message for service installation | {"uri" : "/service/install/service/status",<br>"api_type" : NOTIFICATION,<br>"data"{<br>"response":"Success",<br>"value":{"STATUS": "Started",<br>"ID": "http://www.obigo.com/OBIGO/ESF/vehicle"<br>}}} |
| 12 Completion message for service installation | {"uri" : "/service/install/service/status",<br>"api_type" : NOTIFICATION,<br>"data"{<br>"response":"Success",<br>"value":{<br>"STATUS": "Finished",<br>"ID": "http://www.obigo.com/OBIGO/ESF/vehicle"<br>}}} |
| 13 Error message for service installation | {"uri" : "/service/install/service/status",<br>"api_type" : NOTIFICATION,<br>"data"{<br>"response":"Failure", |

TABLE 1-continued

| Message | Examples of message |
|---|---|
| | "value":{<br>"STATUS": "Error Message....",<br>"ID": "http://www.obigo.com/OBIGO/ESF/vehicle"<br>}}} |

The present disclosure has an effect of allowing easy update of each module by providing an extension service framework system with which a plurality of electronic devices are in conjunction modularly and a method of updates per module.

The present disclosure has another effect of preventing interruption in usage of services of other modules by providing the method of the updates per module.

The present disclosure has still another effect of allowing an independent download service module to perform the download service related to the update packages in an integrated manner, thus improving security and efficiency.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case. As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for updating a specific update-required service module in an extension service framework, on condition that a specific update package of a new version to be used for updating the specific update-required service module among all update-required service modules has been stored in an update server, comprising steps of:
    (a) if a request message for a specific update on the specific update-required service module is acquired from a user device, wherein the user device has a user interface, an extension service framework server performing or supporting another device to perform a process of transmitting the request message for the specific update to a download service module, to thereby allow the download service module to transmit a request for a specific download of the specific update package, among all update packages, to the update server;

(b) if the specific update package is downloaded from the update server and stored in a first storage in conjunction with the download service module and with the extension service framework server and if a request message for service installation is transmitted from the download service module, the extension service framework server performing or supporting another device to perform a process of verifying and unpacking the specific update package, to thereby acquire and store unpacked update files in the first storage;

(c) the extension service framework server performing or supporting another device to perform (i) if the specific update-required service module is included in the extension service framework server, a process of allowing the specific update-required service module to install the unpacked update files stored in the first storage, to thereby update the specific update-required service module, and (ii) if the specific update-required service module is included in another device different from the extension service framework server, a process of transmitting the unpacked update files to a second storage in conjunction with the specific update-required service module and a process of allowing the specific update-required service module to install the unpacked update files stored in the second storage, to thereby update the specific update-required service module; and (d) the extension service framework server performing or supporting another device to perform a process of allowing the specific update-required service module to restart and a process of allowing the specific update-required service module to reconnect with the extension service framework server.

2. The method of claim 1, before the step of (a), further comprising steps of:

(a0-1) if a request for service details on at least part of all the update-required service modules in conjunction with the extension service framework server is inputted through the user device and if a request message for the service details corresponding to the request for the service details is generated, the extension service framework server performing or supporting another device to perform (i) (i-1) a process of acquiring the request message for the service details from the user device, (i-2) a process of transmitting the request message for the service details to the download service module, to thereby allow the download service module to generate a response message for the service details by referring to information on the service details of the at least part of all the update-required service modules, (i-3) a process of acquiring the response message for the service details from the download service module, and (i-4) a process of transmitting the response message for the service details to the user device and (ii) if a request message for service version on the at least part of all the update-required service modules is generated by the user device, (ii-1) a process of acquiring the request message for the service version from the user device, (ii-2) a process of transmitting the request message for the service version to the download service module, to thereby allow the download service module to (1) transmit a request for latest version information on at least part of all the update packages, registered in the update server as corresponding to the at least part of all the update-required service modules, to the update server, (2) acquire the latest version information from the update server, and (3) generate a response message for the service version by referring to the latest version information, and (ii-3) a process of acquiring the response message for the service version and a process of transmitting the response message for the service version to the user device; and (a0-2) the extension service framework server performing or supporting another device to perform a process of allowing the user device to display information on at least part of the service details, the service version, whether latest update packages are registered in the update server, and current version information on the latest update packages respectively of the at least part of all the update-required service modules in conjunction with the extension service framework server by referring to the response message for the service details and the response message for the service version.

3. The method of claim 2, wherein, at the step of (b), after start of downloads of the at least part of all the update packages from the update server, the extension service framework server further performs or supports another device to perform (i) a process of acquiring one or more download related messages of the at least part of all the update packages from the download service module, wherein the download related messages include at least one of a start message for service download, a progress message for the service download, and a completion message for the service download, respectively generated according to the ongoing downloads and (ii) a process of transmitting the download related messages to the user device, to thereby allow the user device to display download related information on the at least part of all the update packages by referring to the download related messages, and wherein, at the step of (c), after start of installation for updates of the at least part of all the update-required service modules, the extension service framework server further performs or supports another device to perform (i) a process of acquiring one or more installation related messages on the unpacked update files, acquired by unpacking the at least part of all the update packages, from the at least part of all the update-required service modules whose updates have started, wherein the installation related messages include at least one of a start message for the service installation, a progress message for the service installation, and a completion message for the service installation, respectively generated according to the ongoing installation of at least part of the unpacked update files and (ii) a process of transmitting the installation related messages to the user device, to thereby allow the user device to display installation related information on the at least part of the unpacked update files by referring to the installation related messages.

4. The method of claim 3, wherein the extension service framework server further performs or supports another device to perform (i) a process of transmitting a request message for a specific download service to the download service module, wherein the request message for the specific download service includes at least one of the request message for the service details, the request message for the service version, and the request message for service update, related to the updates of the at least part of all the update-required service modules, to thereby allow the download service module to (i-1) parse the request message for the specific download service, (i-2) extract information on a specific function to be used in the specific download service, wherein the information on the specific function includes identification information on the specific function and category information on the specific function, and (i-3) generate a response message for the specific download service by referring to the information on the specific function, wherein the response message for the specific download service includes, as results of executing the specific download service, at least one of the response message for the service details, the response message for the service version, and a response message for the service update, respectively corresponding to the request message for the service details, the request message for the service version, and the request message for the service update and (ii) a process of acquiring the response message for the specific download service.

5. The method of claim 1, wherein, at the step of (c), in case the unpacked update files are transmitted to the second storage, the extension service framework server performs or supports another device to perform (i) a process of allowing the specific update-required service module to generate temporary path information in the second storage and (ii) after the unpacked update files are stored in a location represented by the temporary path information, a process of allowing the specific update-required service module to install the unpacked update files.

6. The method of claim 1, wherein, at the step of (c), if the unpacked update files are stored in the first storage or in the second storage, the extension service framework server further performs or supports another device to perform a process of allowing the specific update-required service module to store copies of (1) specific files currently in use and (2) configuration files, respectively corresponding to the unpacked update files.

7. The method of claim 1, wherein, at the step of (b), if the specific update package is downloaded and stored in the first storage, the extension service framework server performs or supports another device to perform (i) a process of allowing the specific update-required service module to generate a subject message including (1) service execution information and (2) installation path information representing a location where the unpacked update files are to be installed, (ii) a process of acquiring the subject message, and (iii) a process of unpacking the specific update package if the service execution information and the installation path information included in the subject message are determined as valid.

8. The method of claim 1, wherein the first storage, at least part of which is encrypted and managed as a secure area, is in conjunction with a security module included in the extension service framework server and wherein information on at least one cryptographic key, to be used for encrypting or decrypting at least one of the secure area and the specific update package stored in the secure area, is managed by the security module.

9. The method of claim 1, wherein, at the step of (c), if a failure is detected during installation of the unpacked update files, the extension service framework server performs or supports another device to perform a process of generating an error message for the service installation including information on the failure and a process of transmitting the error message for the service installation to the user device, to thereby allow the user device to display the information on the failure by referring to the error message for the service installation.

10. The method of claim 1, wherein an OMA-DM (Open Mobile Alliance Device Management) protocol is used for communication between the download service module and the update server, and wherein the download service module includes an OMA-DM client engine for transmitting and receiving information to be used for the specific download of the specific update package.

11. An extension service framework server for updating a specific update-required service module in an extension service framework, on condition that a specific update package of a new version to be used for updating the specific update-required service module among all update-required service modules has been stored in an update server, comprising:
at least one memory that stores instructions; and
at least one processor configured to execute the instructions to perform or support another device to perform:
(I) if a request message for a specific update on the specific update-required service module is acquired from a user device, wherein the user device has a user interface, a process of transmitting the request message for the specific update to a download service module, to thereby allow the download service module to transmit a request for a specific download of the specific update package, among all update packages, to the update server, (II) if the specific update package is downloaded from the update server and stored in a first storage in conjunction with the download service module and with the extension service framework server and if a request message for service installation is transmitted from the download service module, a process of verifying and unpacking the specific update package, to thereby acquire and store unpacked update files in the first storage, (III) (i) if the specific update-required service module is included in the extension service framework server, a process of allowing the specific update-required service module to install the unpacked update files stored in the first storage, to thereby update the specific update-required service module, and (ii) if the specific update-required service module is included in another device different from the extension service framework server, a process of transmitting the unpacked update files to a second storage in conjunction with the specific update-required service module and a process of allowing the specific update-required service module to install the unpacked update files stored in the second storage, to thereby update the specific update-required service module, and (IV) a process of allowing the specific update-required service module to restart and a process of allowing the specific update-required service module to reconnect with the extension service framework server.

12. The extension service framework server of claim 11, wherein, before the process of (I), the processor further performs or supports another device to perform:
(I0-1) if a request for service details on at least part of all the update-required service modules in conjunction with the extension service framework server is inputted through the user device and if a request message for the service details corresponding to the request for the service details is generated, (i) (i-1) a process of acquiring the request message for the service details from the user device, (i-2) a process of transmitting the request message for the service details to the download service module, to thereby allow the download service module to generate a response message for the service details by referring to information on the service details of the at least part of all the update-required service modules, (i-3) a process of acquiring the response message for the service details from the download service module, and (i-4) a process of transmitting the response message for the service details to the user device and (ii) if a request message for service version on the at least part of all the update-required service modules is generated by the user device, (ii-1) a process of acquiring the request message for the service version from the user device, (ii-2) a process of transmitting the request message for the service version to the download service module, to thereby allow the download service module to (1) transmit a request for latest version information on at least part of all the update packages, registered in the update server as corresponding to the at least part of all the update-required service modules, to the update server, (2) acquire the latest version information from the update server, and (3) generate a response message for the service version by referring to the latest version information, and (ii-3) a process of acquiring the response message for the service version and a process of transmitting the response message for the service version to the user device and (I0-2) a process of allowing the user device to display information on at least part of the service details, the service version, whether latest update packages are registered in the update server, and current version information on the latest update packages respectively of the at least part of all the update-required service modules in conjunction with the extension service framework server by referring to the response message for the service details and the response message for the service version.

13. The extension service framework server of claim 12, wherein, at the process of (II), after start of downloads of the at least part of all the update packages from the update server, the processor further performs or supports another device to perform (i) a process of acquiring one or more download related messages of the at least part of all the update packages from the download service module, wherein the download related messages include at least one of a start message for service download, a progress message for the service download, and a completion message for the service download, respectively generated according to the ongoing downloads and (ii) a process of transmitting the download related messages to the user device, to thereby allow the user device to display download related information on the at least part of all the update packages by referring to the download related messages, and wherein, at the process of (III), after start of installation for updates of the at least part of all the update-required service modules, the processor further performs or supports another device to perform (i) a process of acquiring one or more installation related messages on the unpacked update files, acquired by unpacking the at least part of all the update packages, from the at least part of all the update-required service modules whose updates have started, wherein the installation related messages include at least one of a start message for the service installation, a progress message for the service installation, and a completion message for the service installation, respectively generated according to the ongoing installation of at least part of the unpacked update files and (ii) a process of transmitting the installation related messages to the user device, to thereby allow the user device to display installation related information on the at least part of the unpacked update files by referring to the installation related messages.

14. The extension service framework server of claim 13, wherein the processor further performs or supports another device to perform (i) a process of transmitting a request message for a specific download service to the download service module, wherein the request message for the specific download service includes at least one of the request message for the service details, the request message for the service version, and the request message for service update, related to the updates of the at least part of all the update-required service modules, to thereby allow the download service module to (i-1) parse the request message for the specific download service, (i-2) extract information on a specific function to be used in the specific download service, wherein the information on the specific function includes identification information on the specific function and category information on the specific function, and (i-3) generate a response message for the specific download service by referring to the information on the specific function, wherein the response message for the specific download service includes, as results of executing the specific download service, at least one of the response message for the service details, the response message for the service version, and a response message for the service update, respectively corresponding to the request message for the service details, the request message for the service version, and the request message for the service update and (ii) a process of acquiring the response message for the specific download service.

15. The extension service framework server of claim 11, wherein, at the process of (III), in case the unpacked update files are transmitted to the second storage, the processor performs or supports another device to perform (i) a process of allowing the specific update-required service module to generate temporary path information in the second storage and (ii) after the unpacked update files are stored in a location represented by the temporary path information, a process of allowing the specific update-required service module to install the unpacked update files.

16. The extension service framework server of claim 11, wherein, at the process of (III), if the unpacked update files are stored in the first storage or in the second storage, the processor further performs or supports another device to perform a process of allowing the specific update-required service module to store copies of (1) specific files currently in use and (2) configuration files, respectively corresponding to the unpacked update files.

17. The extension service framework server of claim 11, wherein, at the process of (II), if the specific update package is downloaded and stored in the first storage, the processor performs or supports another device to perform (i) a process of allowing the specific update-required service module to generate a subject message including (1) service execution information and (2) installation path information representing a location where the unpacked update files are to be installed, (ii) a process of acquiring the subject message, and (iii) a process of unpacking the specific update package if the service execution information and the installation path information included in the subject message are determined as valid.

18. The extension service framework server of claim 11, wherein the first storage, at least part of which is encrypted and managed as a secure area, is in conjunction with a security module included in the extension service framework server and wherein information on at least one cryptographic key, to be used for encrypting or decrypting at least one of the secure area and the specific update package stored in the secure area, is managed by the security module.

19. The extension service framework server of claim 11, wherein, at the process of (III), if a failure is detected during installation of the unpacked update files, the processor performs or supports another device to perform a process of generating an error message for the service installation including information on the failure and a process of transmitting the error message for the service installation to the user device, to thereby allow the user device to display the information on the failure by referring to the error message for the service installation.

20. The extension service framework server of claim 11, wherein an OMA-DM (Open Mobile Alliance Device Management) protocol is used for communication between the download service module and the update server, and wherein the download service module includes an OMA-DM client engine for transmitting and receiving information to be used for the specific download of the specific update package.

* * * * *